United States Patent [19]

Pham et al.

[11] Patent Number: 5,300,960

[45] Date of Patent: Apr. 5, 1994

[54] DOT PRINTER AND METHOD FOR GREY LEVEL RECORDING AND CIRCUIT FOR USE IN SAME

[75] Inventors: Hieu T. Pham, Webster; Eric K. Zeise, Pittsford; Pin S. Tschang, Rochester, all of N.Y.

[73] Assignee: Eastman Kodak Company, Rochester, N.Y.

[21] Appl. No.: 290,002

[22] Filed: Dec. 27, 1988

[51] Int. Cl.$^5$ ............................................. G06K 15/00
[52] U.S. Cl. ..................................... 346/154; 346/157
[58] Field of Search ................. 346/154, 76 PH, 108, 346/107 R, 157; 364/518, 519; 358/296, 298

[56] References Cited

U.S. PATENT DOCUMENTS

| | | |
|---|---|---|
| 3,988,742 | 10/1976 | Meier et al. |
| 4,455,578 | 6/1984 | Fearnside |
| 4,525,729 | 1/1985 | Augulnek et al. ................... 346/154 |
| 4,596,995 | 6/1986 | Yamakawa et al. |
| 4,712,116 | 12/1987 | Reinten |
| 4,727,428 | 2/1988 | Futatsugi et al. |
| 4,746,941 | 5/1988 | Pham et al. |
| 4,750,010 | 6/1988 | Ayers et al. |
| 4,768,046 | 8/1988 | Minor et al. ........................ 346/154 |
| 4,855,760 | 8/1989 | Kanayama |

Primary Examiner—Arthur G. Evans
Attorney, Agent, or Firm—Norman Rushefsky

[57] ABSTRACT

A non-impact dot printer such as an LED printer, records grey levels of each dot by pulse width modulating the exposure on-time for each LED. The on-time of each LED for each exposure is controlled by comparing a count, representing an exposure time, with a second time changing count. The time changing count changes in accordance with clock periods of varying periodicity that are determined in accordance with human perception response criteria. This allows for the need for fewer data bits to define grey scale and exposure correction information reducing the number of data lines otherwise required.

32 Claims, 8 Drawing Sheets

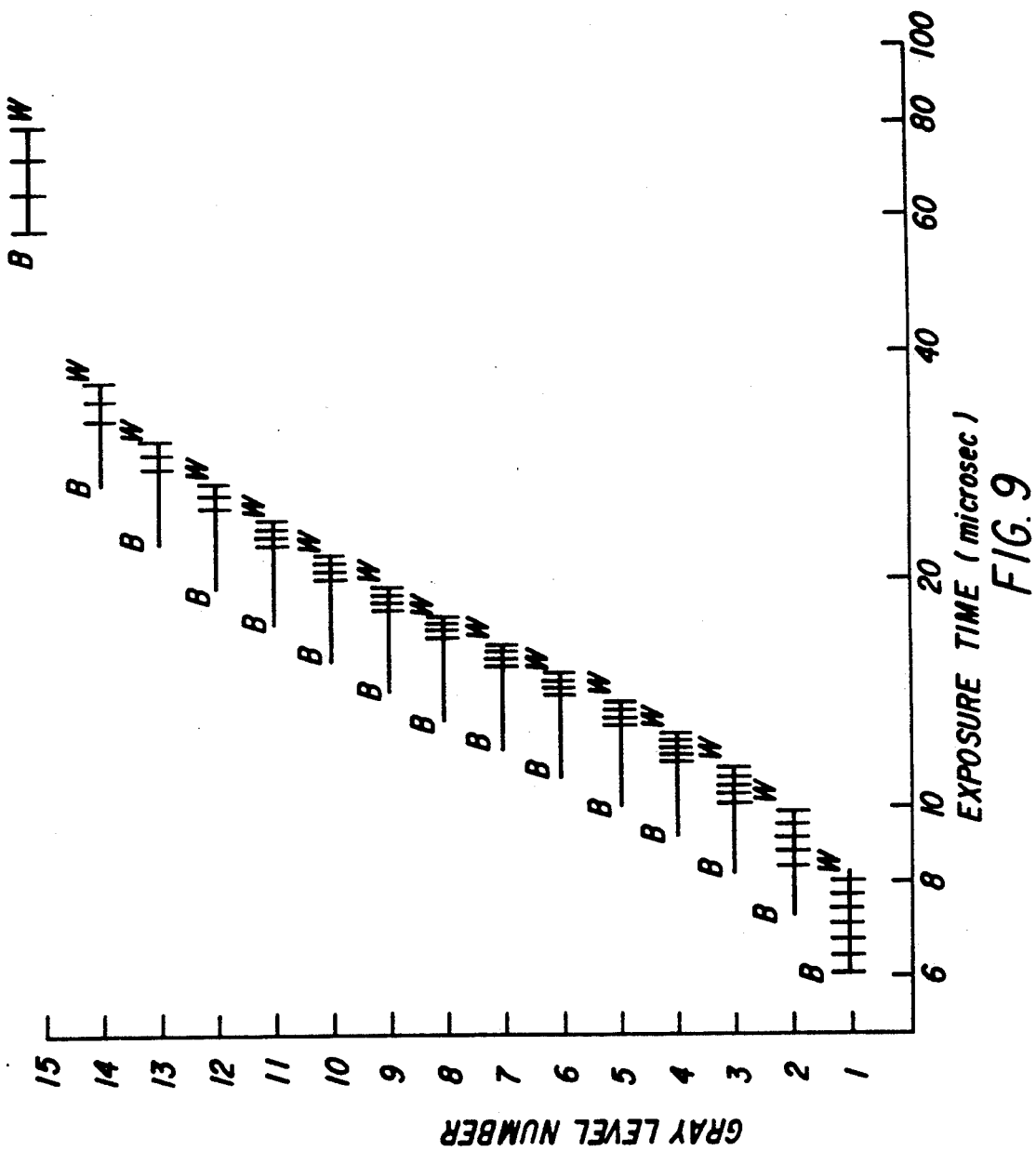

DOT PRINTER AND METHOD FOR GREY LEVEL RECORDING AND CIRCUIT FOR USE IN SAME

BACKGROUND OF THE INVENTION

1. Field of the Invention

The present invention relates to a non-impact dot printer for printing halftone or continuous tone information and the like with small pixels (dots).

2. Description of the Prior Art

Various non-impact recording or printer heads for use as dot printers are known. Examples of such heads include an electrostatic printer head, an LED (light emitting diode) array printer head, ink-jet printer head, thermal printer head, etc. While the invention will find utility with regard to non-impact printers in general, discussion will be made herein with regard to LED printer heads with which the invention is particularly suited.

In U.S. Pat. No. 4,750,010 an LED printer is described in which a series of LED's arranged in a straight line are selectively activatable for brief periods to form dot-like images on a recording surface. One feature of this printer is that the signal pulses to all the selected LED's causing same to be activated during any one PEL period (picture element period or dot line period) are symmetrical about a center line. The term used to describe this arrangement of signals is "center pulse width modulated." The reasons for arranging such signals in this manner are described in the patent. In one embodiment of a printer head described in this patent, grey scale recording is achieved by having a digital comparator associated with each LED. At one input to the comparator, there is provided the data in the form of a plurality of digital data bits representing an exposure on-time for that LED for that PEL period. At a second input to the comparator, an input from an up-/down counter is provided that is rapidly changing in accordance with signals emitted from a high speed clock. As the counter output value decreases towards zero at some point in time a match is sensed by the comparator between the two inputs of the comparator (in accordance with its operating criterion). The LED then turns on and remains on for a very brief duration until a subsequent sensing of a match by the comparator occurs during a count-up phase of the counter. The above patent notes that the data may be adjusted to provide also for exposure balancing of the LED's. This is desirable where non-uniformity in illumination from LED to LED on the printer head may be expected. While the patent notes that a programmable clock may be employed to adjust the time period for each clock pulse, the clock periods will nevertheless be uniform after any such adjustment.

A problem with the above is that it does not efficiently cover as much exposure space as might be desirable for grey level recording. Assuming one employs six data bits to define each pixel, 63 levels of grey may be recorded (not including white, i.e., no activation.). However, these 63 levels must be recordable within a time period comprised of at most 126 uniform clock periods plus a minimum established time, $T_{MIN}$. Where the clock periods are of relatively short duration, the 63 levels of grey may not provide the desirable range of grey levels. On the other hand, where the clock periods are of relatively longer duration, adequate extremes of grey may be recorded but fine differences in grey level recording particularly desired at relatively lower grey values will be lost.

It is an object of this invention, therefore, to overcome the deficiencies described in the prior art.

SUMMARY OF THE INVENTION

The objects of the invention are realized by a circuit for generating a set of waveforms wherein the circuit includes digital counting means, clock means for changing the count of said counting means; comparator means comparing the time changing count with each of several different predetermined counts and generating respective waveform pulses, each of which commences and/or terminates with a respective predetermined count and terminates with a respective predetermined count the time duration of each waveform pulse being different dependent upon the respective predetermined count selected and characterized by wherein the clock means provides clock pulses at non-uniform intervals for changing the count at non-uniform intervals.

The objects of the invention are further realized by a non-impact printer which incorporates the above circuit for activation of the various recording elements forming said non-impact printer.

The objects of the invention are further realized by a method of printing which uses an array of radiation-emitting elements, the method comprising the steps of: (a) advancing an imaging surface adapted to receive the radiation relative to the array, selectively enabling the elements for predetermined periods of time during a cycle of operation to form an image on the surface; (b) operating a digital counting means having a plurality of output lines with signals thereon representing in digital form a time-changing numerical count; (c) changing the count represented by the output lines in response to clock pulses; (d) comparing the time-changing count with each of several different predetermined counts and generating respective waveform pulses, each of which commence and/or terminates with a respective predetermined count, the time duration of each waveform pulse being different dependent upon the respective predetermined count selected; and (e) the set of waveform pulses determining the enabling time of selected elements, and characterized by the step of providing the clock pulses at non-uniform intervals.

DESCRIPTION OF THE DRAWINGS

FIGS. 4–9 illustrate various graphs that may be used to determine the various allowed on-times for the recording elements.

DESCRIPTION OF THE PREFERRED EMBODIMENTS

Because apparatus of the type described herein are well known, the present description will be directed in particular to elements forming part of, or cooperating more directly with, the present invention.

Figure 1:
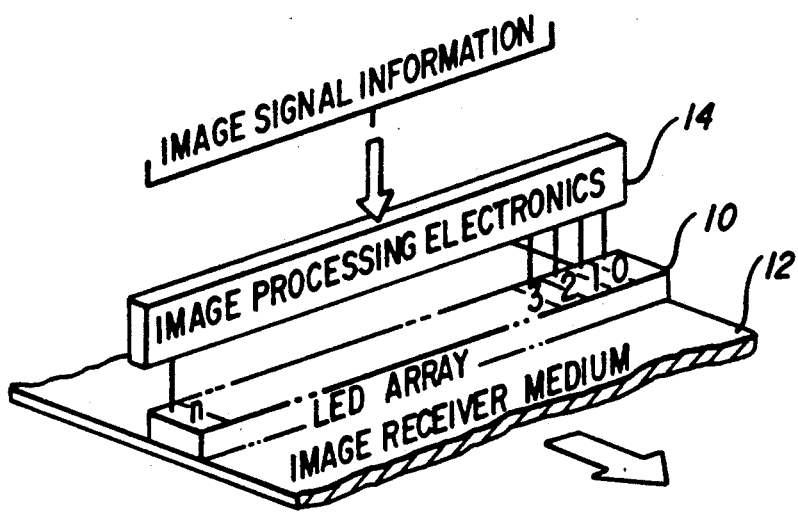
FIG. 1 is a perspective view illustrating the general arrangement of a non-impact printer as used in the embodiment of the invention and as known in the prior art.

The apparatus for the herein disclosed invention is typified by the diagram of FIG. 1: a linear array 10 of say 3584 triggerable radiation sources; e.g., LED's, is disposed to expose selectively a photosensitive image-receiver medium 12 that is movable relative to the array by suitable conventional means (not shown). Optical means for focusing the LED's onto the medium may also be provided. In this regard, gradient index optical fiber devices such as Selfoc (trademark of Nippon Sheet Glass Co., Ltd.) arrays are highly suited. The LED's of the array are triggered into operation by means of image processing electronics 14 that are responsive to image signal information. Depending on the duration for which any given LED is turned on, the exposure effected by such LED is more or less made. Where the medium 12 is, say, photographic film the latent image formed line by line by selective exposure of said LED's may be subsequently developed by conventional means to form a visible image. Where the medium 12 is an electrophotographic receptor, the LED's may be used to form an electrostatic image on a uniformly electrostatically charged photoconductor and this image developed using colored toner particles and perhaps transferred to a copy sheet, see U.S. Pat. No. 3,850,517, the contents of which are incorporated herein.

Figure 2:
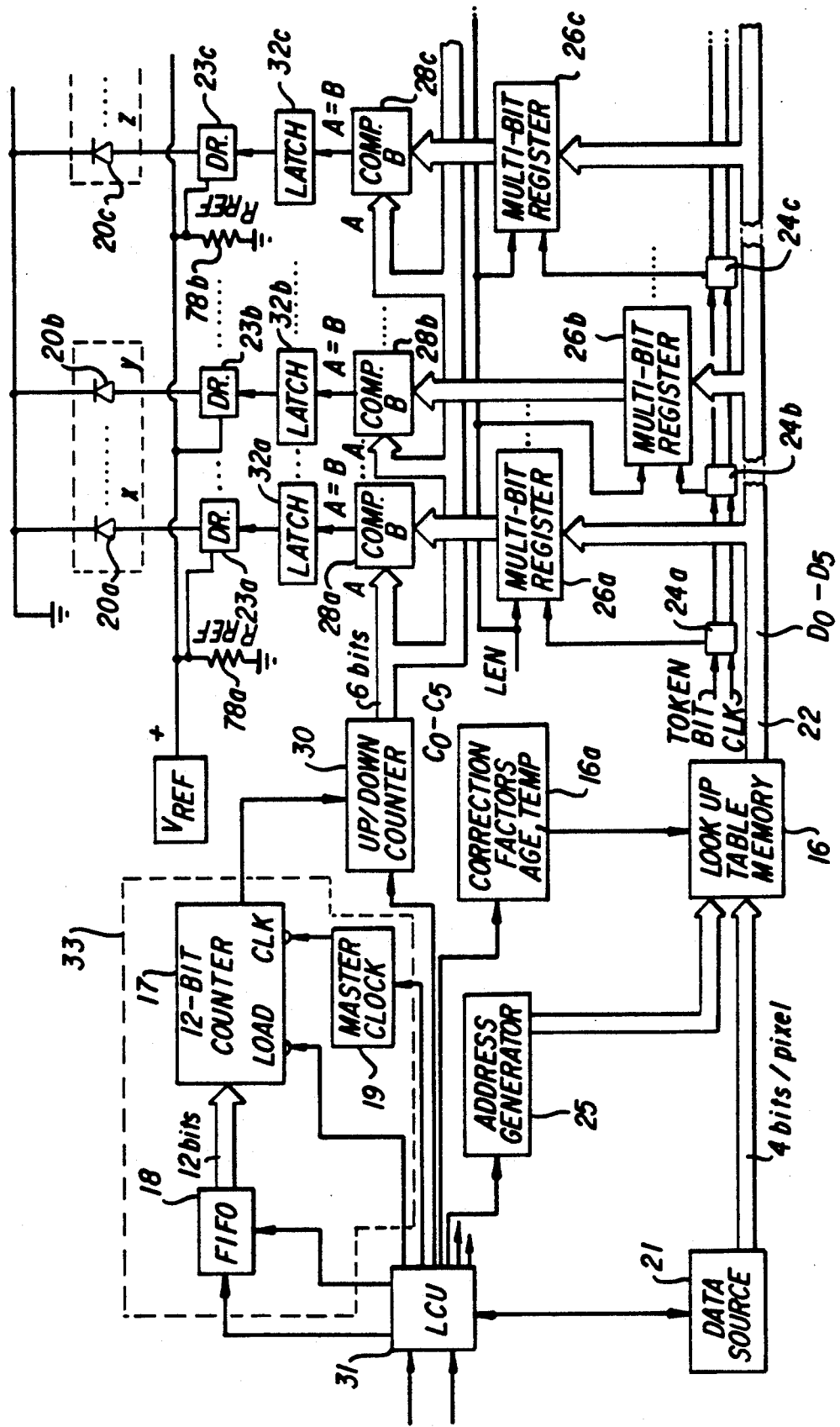
FIG. 2 is a schematic of a printer circuit for recording grey scale information in accordance with the invention.

With reference now to FIG. 2, a circuit is shown which may be used for triggering selectively the LED's 20 that together comprise the array 10. Only a few of the LED's and its associated driver circuitry are shown for clarity purposes, it being understood that the circuitry for driving such other LED's is similar to that described for the illustrated examples. While the figure shows all the driver circuitry associated with the LED's located to one side of the line of LED's, it is well known to place these circuits on both sides of the line of LED's to provide more efficient utilization of space.

Data to be printed for each line is in the form of binary digital signals, e.g., 1's and 0's. This data on lines labeled $D_0$–$D_5$ are outputted in parallel onto the data bus 22. The data on lines $D_0$–$D_5$ comprises, in this example, a six-bit signal representing an exposure time for a particular LED for printing a single grey level recorded dot. Synchronously with the generation of each six-bit data signal, there is generated by, for example, a logic and control unit (LCU) 31 a token bit signal which is a single bit that is shifted down a shift register formed by a plurality of individual registers 24a, 24b, 24c, etc. Each such register is associated with a particular LED. This token bit determined which of the LED's a particular set of data on bus 22 is intended. In operation, a series of six-bit data signals are provided on bus 22 and one six-bit signal is latched by each of the 3584 multibit registers 26a, 26b, 26c associated with each LED. The latching being in response to the presence of the token bit in the particular register 24a or 25b or 25c, etc. Further description relative to a circuit for selectively latching this data is provided in U.S. Pat. No. 4,746,941, entitled "Dot Printer With Token Bit Selection of Data Latching," the contents of which are incorporated herein by this reference. After a six-bit data signal is stored in each of the multi-bit registers, a latch enable (LEN) signal is provided by the LCU 31 to shift this six-bit signal to an output stage or latch of each register so that a six-bit level data signal (say decimal 10 for LED 20a for this particular PEL period) is output to one input terminal (B) of a respective digital comparator 28a, 28b, 28c, etc. associated with each LED. At this point in time a digital counter 30 is enabled by LCU 21 to count down, in this example, from decimal 63 ($2^6-1$) to 0. The output of the counter 30 is a six-bit signal, in this example ($C_0$–$C_5$) representing in digital form a number or count which changes periodically in accordance with clock pulses from a programmable clock 33. With each pulse (or trailing edge of same) from clock 33, the counter changes its count at its output. The output of counter 30 is input into each of the input terminals (A) of the digital comparator. Thus, the comparators now compare the signals at their respective A and B inputs in accordance with the comparators criteria for operation, i.e., is A equal B? When the count output by the counter 30 and inputted at terminal A is equal to a respective input data signal count input at terminal B (decimal 10, for example, but can be any number between 1 and 63) the output of a respective comparator goes to a digital logic high level and is latched at a respective latch register 32a, 32b, 32c, etc. The latched signals allow drivers 23a, 23b, 23c to be enabled, at the rising edge of the next clock pulse from programmable or variable clock 33, to commence and maintain current respectively to LEDs 20a, 20b, or 20c, etc. After the counter 30 counts down to zero, the counter 30 is either reset by the next clock pulse into a count-up mode or is inhibited from counting additional clock pulses for a minimum period $T_{MIN}$ that is programmed into the counter or provided by other suitable means. In the example shown in FIG. 3, the duration of $T_{MIN}$ is from a count of "1" in the down counting mode to a count of "1" in the up counting mode and the manner for controlling the time for reaching these counts will further be described below. In any event, after this predetermined time period $T_{MIN}$, the counter is set to count in its count-up mode and commences counting clock pulses again. When the counter output in its count-up mode reaches decimal 10, the output of comparator 28a changes and the latch 32a is reset and current to the LED 20a ceases. The other LED's 20b, 20c, etc. operate in similar fashion but their data will require different count values to turn on and off in accordance with grey scale data provided in their respective multi-bit registers. What these LED's will, thus, have in common with LED 20a is that all will have their respective current pulses centered. The current level to each LED is the same but the pulse duration for each LED during each line of print is varied. In this embodiment the LED's may be initially "balanced" such as by adjusting a "trim" resistor 78a, 78b, associated with each driver chip, see U.S. patent application Ser. No. 199,981, filed May 27, 1988. Other known techniques for balancing output of the recording elements may also be provided. See, for example, U.S. application Ser. No. 290,012, filed concurrently herewith in the names of Pin Tschange et al. In addition, further balancing or correction for unequal light output may be provided by adjustment of the data in accordance with the characteristics of each LED. Thus, a memory device such as a programmable read-only memory device or PROM may store the characteristics of each LED and data for that LED can be modified to provide an input count at terminal B that represents data modified by the exposure characteristics of the LED. For example, for an LED that is a relatively strong light emitter the PROM would modify data bits for that LED to reduce the count that otherwise would be provided at terminal B based solely on the data.

Further description relative to this additional type of balancing or recording elements will be provided below.

Figure 4:
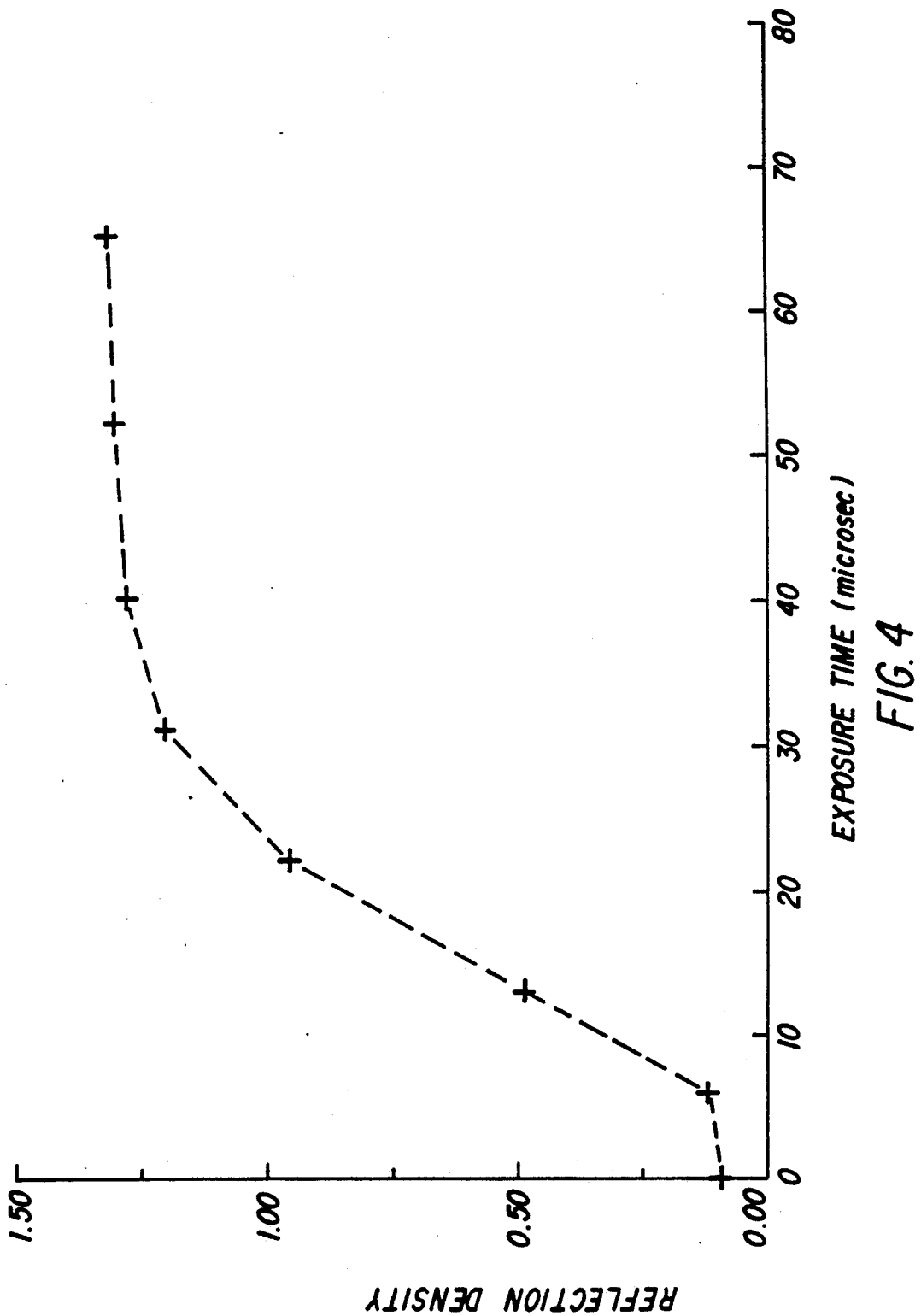

With reference to FIG. 4, there is illustrated a typical diagram illustrating recorded reflection density versus exposure time for a recording using a single average LED in the array. The recorded reflection density will vary obviously in accordance with the exposure time of this LED. As may be noted the eventual reflection density approaches a maximum value and that further exposure durations produce some, but not great, changes in recorded reflection density.

Figure 5:
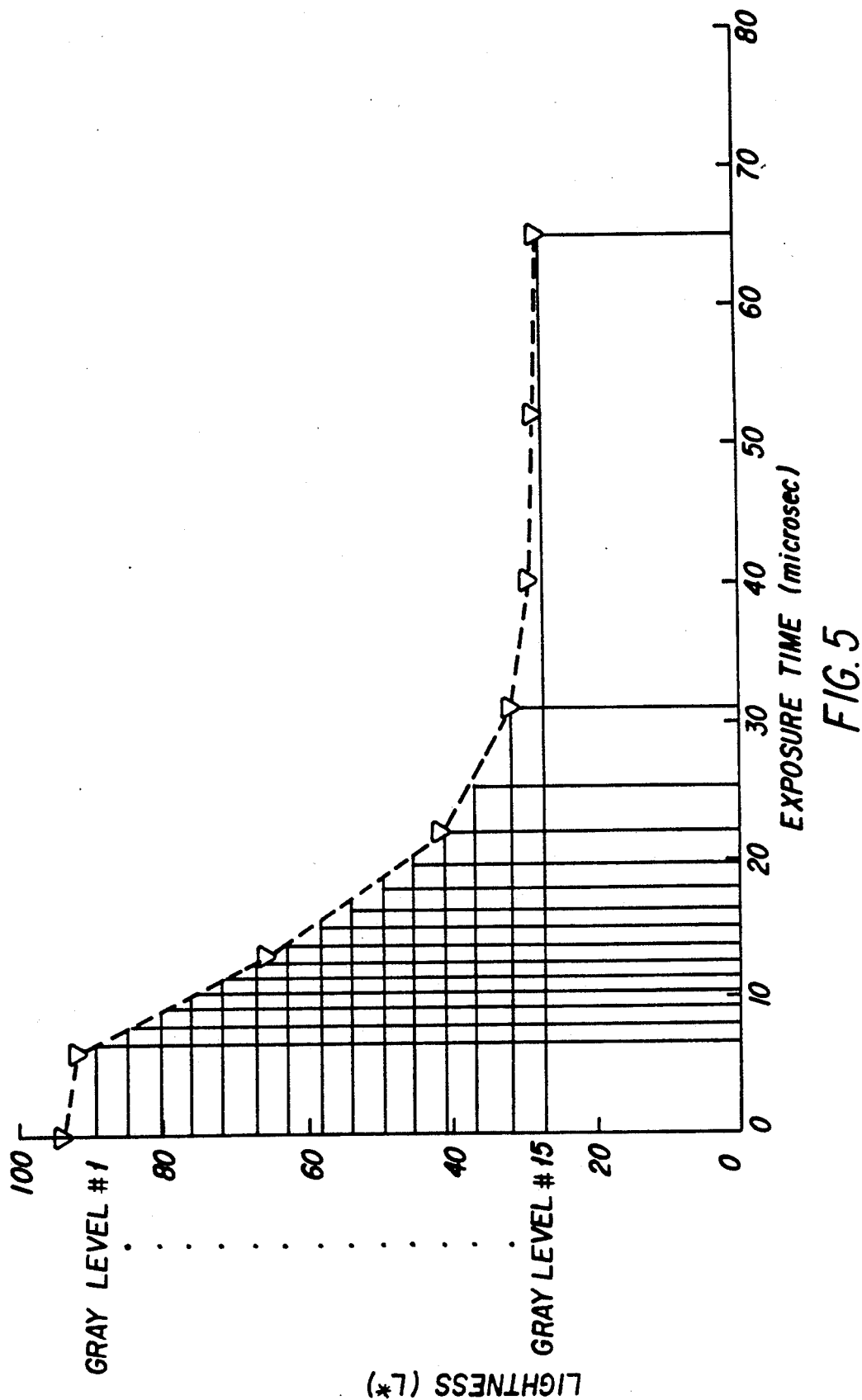

FIG. 5 illustrates the data of FIG. 4 transformed into lightness space. As known to those skilled in the art, such a transformation may be readily made by taking a value of reflection density (D) and forming the variable "lightness" (L*) therefrom in accordance with any of several known equations. Like transformations, including those for use in color printing and providing transformations into color space are also well known. Thus, lightness may now be plotted versus time and provides a relationship between various exposure times. It should be kept in mind that the light output of this LED is preferably balanced to at least some degree using adjustments to say $R_{REF}$, the driver resistance value as described above. The advantage of employing the relationship between lightness and time is that, as is known, one can divide lightness space into equal increments and employ the corresponding exposure times to obtain a series of exposure areas with levels of grey that to the human eye appear to represent equal percentage changes in lightness. Thus, as shown in FIG. 5, lightness space is divided into 15 equally spaced grey levels (1-15) where obviously the higher the lightness value, the lower the grey value. The division into 15 levels is selected since in this embodiment output by the data source 21 provides 4 bits per pixel of rasterizied data or grey level information or decimal 15 ($2^4-1$) levels of grey and one level being no or "0" exposure. Thus, the 15 levels are chosen by selecting the lowest and highest desired levels of lightness and dividing the space in between to provide 15 levels of lightness or grey values. For each grey value a corresponding exposure time is associated therewith for each LED.

Figure 6:
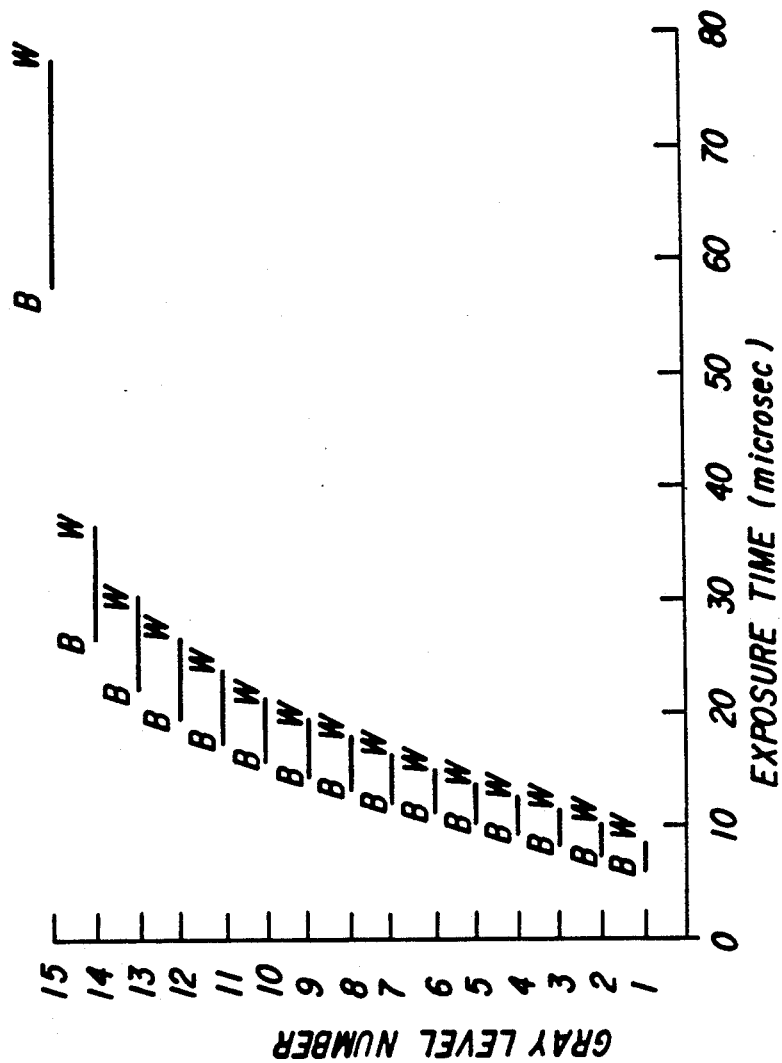

Description will now be had with reference to the graph in FIG. 6. In the description provided with regard to FIG. 5, it was noted that this was typical data for an average LED. Recall that the LEDs have been somewhat balanced by use of selective adjustment of $R_{REF}$ associated with say 64 LEDs driven by the respective driver chip. However, there will still be a small percentage of differences in light outputs between the LEDs; i.e., for the same signal some LEDs will provide more light and others less light because of their inherent differences or due to differences in their drivers or variations in LED fabrication process. FIG. 6 represents an illustration of this. Each horizontal hash-like line represents a range of exposure times that are needed for all the LEDs in the array to provide an exposure of the indicated grey level. Taking grey level No. 1, for example, the very brightest LED in the arrays will require the least amount of exposure time to record a density equivalent to grey level No. 1. This exposure will be for the period $T_{MIN}$ shown in FIG. 3. The minimum exposure time for each grey level is indicated by the letter B (for brightest LED's) which is located at the left most extreme of each line. On the other hand, the very weakest LED's in the array will require the longest exposure time (indicated by a W at the end of the line) to produce a dot having a density equal to grey level No. 1. Obviously, the remaining LED's in an array will require exposure "on" times between points B and W. The range of exposure times for each LED may then be determined for each grey level as shown.

It may also be noted in FIG. 6 that for any LED the exposure time difference for producing a dot of grey level No. 2 versus that for producing a dot to form grey level No. 1 is a very small difference in time. In this regard, compare the difference in exposure times for the brightest LED's (B) at grey level No. 1 and at grey level No. 2 with that difference in exposure times for the brightest LED's between grey levels Nos. 14 and 15. While the time between "B" of grey level 15 and "W" of grey level 14 is shown exaggerated to demonstrate the flexibility of the improved printing apparatus, it is generally true that the eye is more sensitive to changes at the lower levels of density than for changes at the upper levels of density. Similarly, if one desired to precisely balance the outputs of all the LED's on an array an algorithm for achieving this balance can preferably take advantage of this fact. However, for one designing a printhead using digital devices a constraint is provided as to how much correction information can be provided realizing that data has to be carried over lines formed on the printhead and only so many lines can be economically provided on a printhead. In addition, the more lines of data require more complexity in the logic devices for handling this data on the printhead.

With this in mind, reference will now be made to FIG. 7 wherein the exposure times associated with each grey level are shown divided up by vertical lines which will now be explained. Recognizing that a printhead has 3584 LEDs the range of exposure times for producing a dot of grey level No. 1 will fall on the horizontal line shown. If this line is divided into say seven distinct values, all exposures times on this horizontal line can be approximated by one of the times represented by the seven vertical lines crossing this horizontal time line. Similarly, this can be repeated for each grey level but note that higher grey levels need not have as many approximating points as the eye may not be able to detect finer approximations. Recognizing this will result in more efficient use of available data lines.

Figure 8:
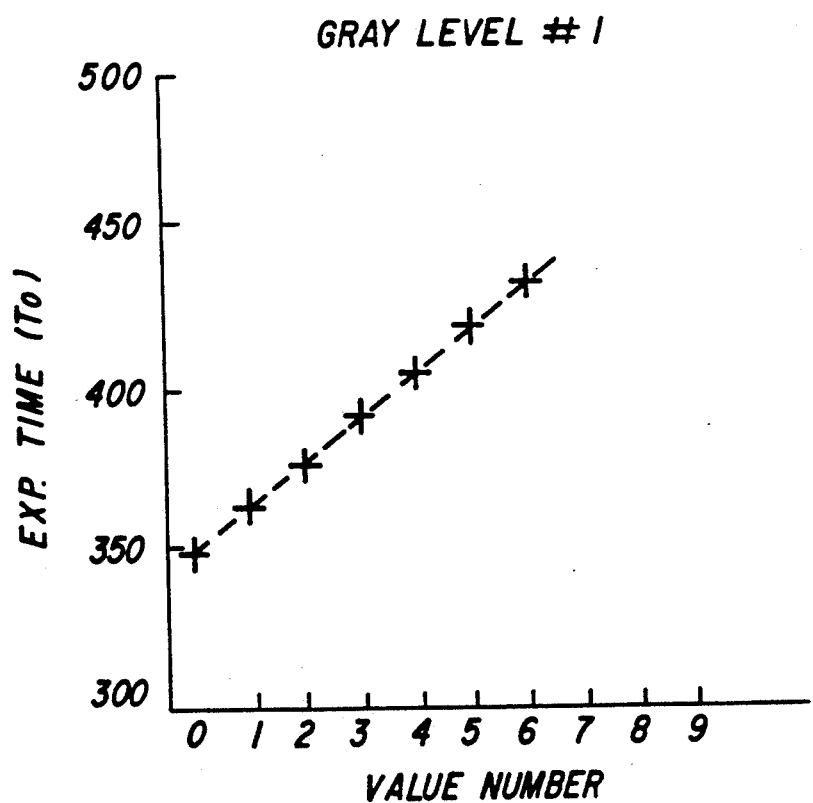

With reference now also to the graph of FIG. 8, the seven approximated exposure times for grey level No. 1 are assigned a value "0" through "6" and are plotted against exposure time in terms of number of master clock periods. Time in the printer apparatus of FIG. 2 is measured in terms of clock periods from master clock 19. Master clock 19 being a clock providing regular pulses at a frequency of say 40 MHz. Thus, for producing grey level No. 1 the brightest LEDs will be "on" for say 350 pulses from master clock 19.

Figure 7:
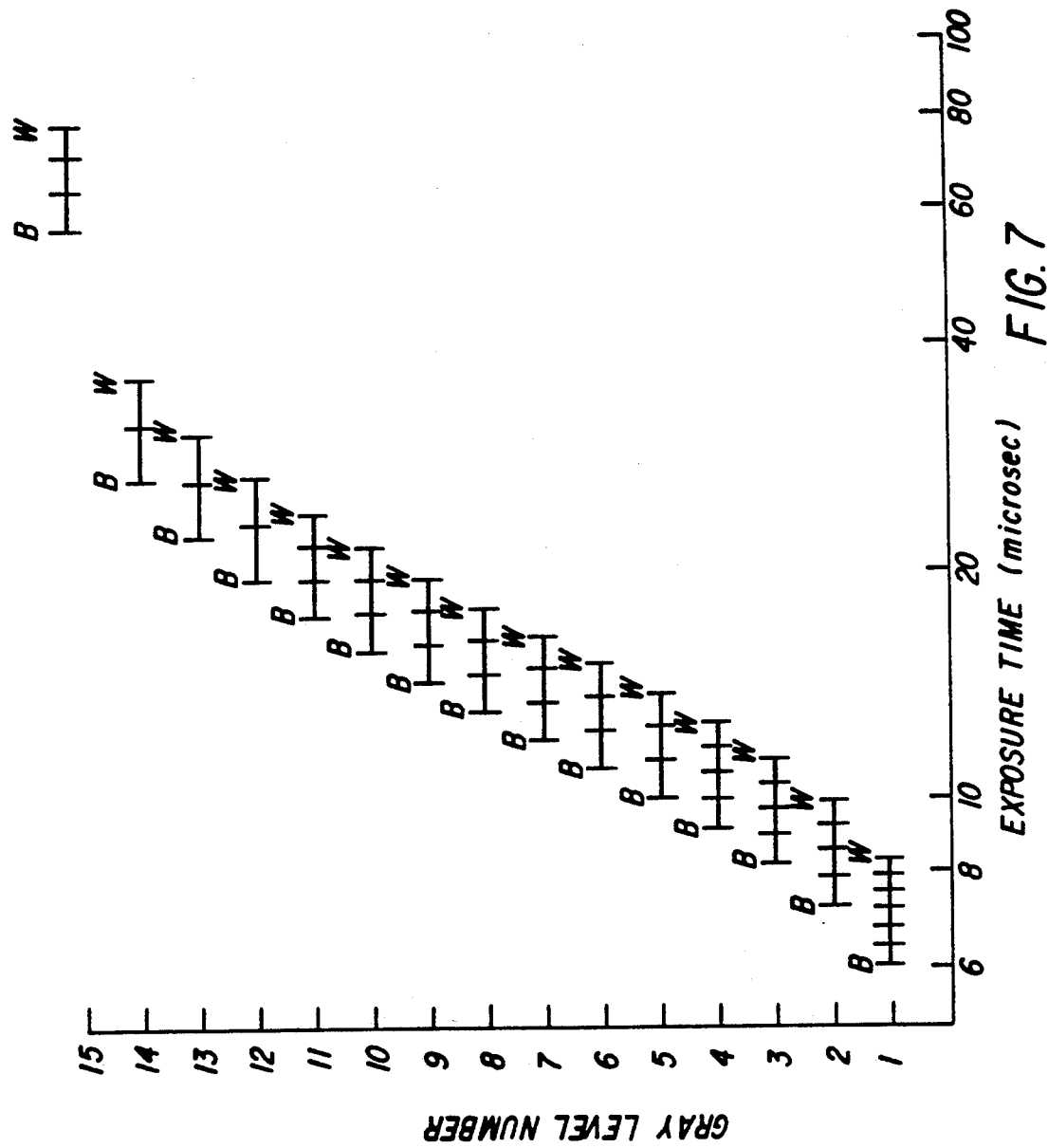

With reference now to the graph of FIG. 9, a modification from FIG. 7 has been made to eliminate overlap in exposure times between the various grey levels. In this example, the five approximating time values used for grey level No. 2, however, are confined to the time line portion of this line that will not provide overlap with other times in other grey levels. Thus, except for grey level No. 1, in this example closer approximations are made for exposure correction for the various grey levels as will be described below and more efficient use of data realized.

As may be noted from FIG. 9, for this example, the allowed exposure times number 63 which is $2^6-1$. This can be seen by counting the vertical exposure time lines shown, i.e., add the seven lines for grey level No. 1, the five lines for grey level No. 2, the five lines for grey level No. 3, etc. Thus, only 6 data lines are required to go to the printhead to provide possible exposure enabling times for the LED's that extends over a relatively long duration yet provides for fine approximations for correction in those areas of lightness space where it is needed.

Description will now be provided as to a preferred method and apparatus for generating the signals for creating these 63 exposure times which are nonlinearly related. In the graph shown in FIG. 9, exposure times are shown to vary, for the particular printhead illustrated, from 6 microseconds to about 80 microseconds. Recall also that the technique employed for creating a single pulse width exposure period is to provide a minimum on time $T_{MIN}$ for the shortest duration pulse used which can be considered the pulse for driving the very brightest LED for the minimum time necessary to record grey level No. 1. As noted in the graph of FIG. 8, an exposure in time units is equated with a value number which latter number may be used as the count from counter 30. For each grey value, there are calculated the corresponding value numbers (from 0 to 63) of the allowed exposure times shown in FIG. 9.

With reference now to FIG. 2, description will now be provided relative to the circuit 33 for generating clock pulses that change with a varying periodicity. A memory device such as a first-in, first-out memory 18 is loaded in this example with a 12-bit number that is provided, for example, by a serial signal from LCU 31. This 12-bit number is output in parallel from the FIFO 18 and input to a 12-bit counter 17 that includes a comparator means. At the beginning of a PEL period (picture element period) this counter is reset by a signal from LCU 31 and in response to a synchronizing signal from LCU 31 commences to count clock pulses from master clock 19. Upon reaching the 12-bit count provided at its input, the counter 17 emits a single pulse and resets itself to repeat this operation. Alternatively, the counter may be preset to the 12-bit count that is input thereto and count down to zero and emit a single pulse. As long as the 12-bit number at its input remains unchanged the counter 17 will emit a series of pulses equally spaced in time. The output of this counter 17 comprises the output of the elements defined as the variable clock 33. As may be noted in FIG. 3 in the time line labelled "variable clock" the output of this clock is shown to be groups of clock pulses wherein, for this example, in each group the respective pulses are uniformly spaced. Each of these groups can be thought of as representing exposure times for a particular grey level. However, recall also that as described with regard to FIG. 9 that there is overlap in exposure times between grey levels. As may be noted from FIG. 9, the exposure times for grey level No. 15 can be approximated by 4 exposures times indicated by the vertical lines. These 4 times are represented by the 4 uniformly spaced in-time clock pulses (rising edges of variable clock 33) in the group labeled (grey level) "#15 MAX-#15 MIN." The spacing between clock pulses is directly related to the 12-bit number or clock coefficient output from FIFO memory device 18. In this example, the FIFO memory has input therein, from LCU 31, 127 clock coefficients. As the clock pulses are to be created in groups of uniformly spaced pulses, some of the coefficients are the same so that after counting to the 12-bit number and emitting a single variable clock pulse the counter receives the next 12-bit number which may be the same as the previous 12-bit number.

Figure 3:
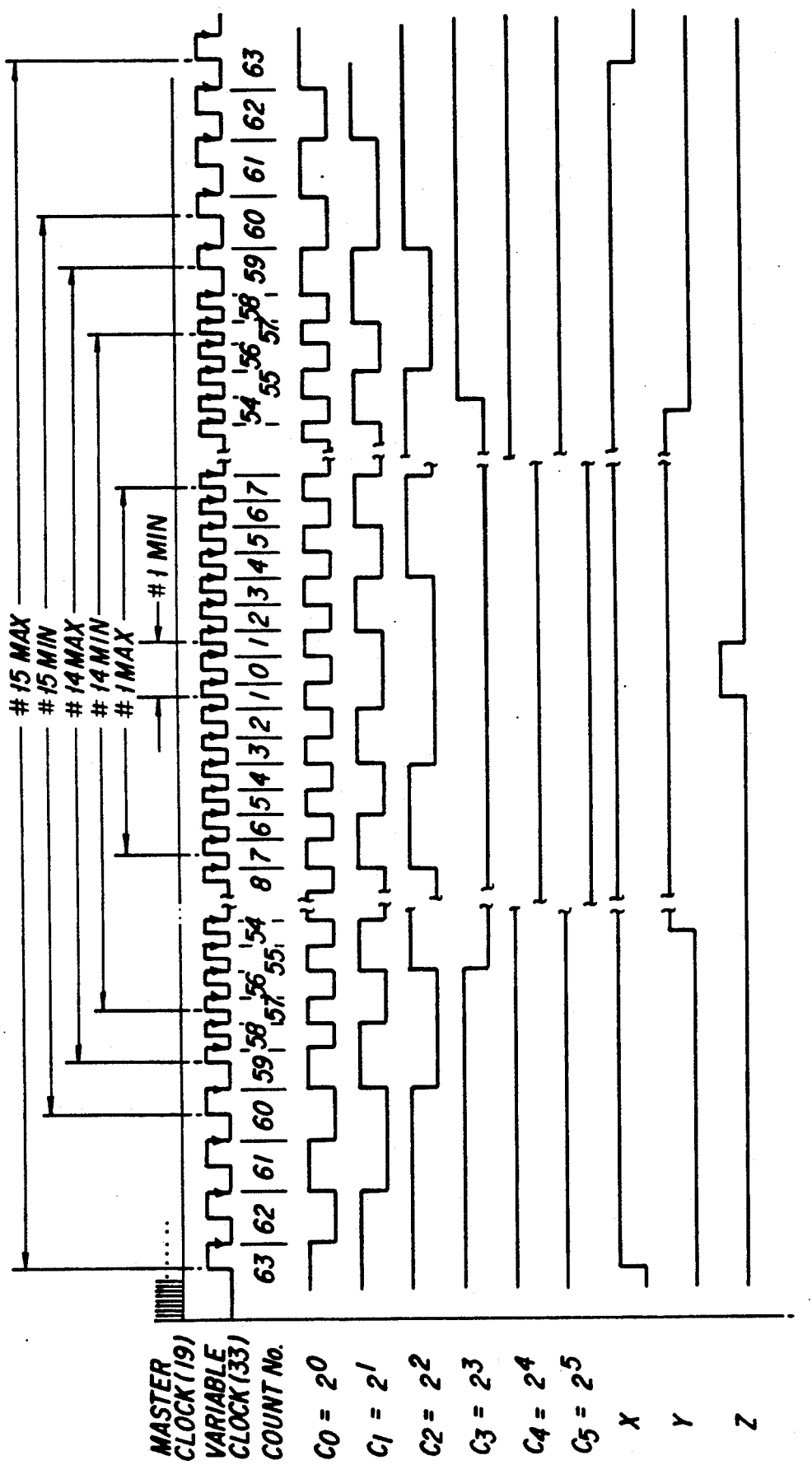
FIG. 3 is a timing diagram of sets of waveforms generated using the apparatus and method of the invention.

After producing these 4 uniformly spaced clock pulses for grey level No. 15, the FIFO outputs a new 12-bit number. This causes 12-bit counter 17 to create a series of differently uniformly spaced pulses that are spaced a different amount in time related to the new 12-bit number output by the FIFO memory to the counter 17. The three pulses in this next group are labelled (grey level) "#14 MAX-#14 MIN" and relate to the three time divisions of grey level No. 14 shown in FIG. 9. The process continues in like manner to that described above with groups of uniformly spaced clock-like pulses created but having different periodicity from group to group. The up/down counter 30 counts these pulses and initially is in a down count mode. Thus, the output of the counter 30 has its six output lines $C_0$-$C_5$ provided with digital signals as shown in FIG. 3. The decimal representation of the combined count in all six lines $C_0$-$C_5$ is also indicated. As may be noted the count changes nonlinearly with time just in the same way for the time line illustrated in FIG. 9. Note in FIG. 3 that the longest duration pulse that can be provided is that shown as the pulse x used for the weakest (w) of the LEDs to energize each for a time period to record a grey level No. 15 dot. The shortest duration pulse Z is provided to the brightest of the LEDs (B) when energized to each record a grey level No. 1 dot. All other exposure times for the LEDs will be like pulse Y for a duration that is between these two extremes. Note all exposure pulses to create a dot are of a single pulse and are center pulse width modulated to provide for a better looking print particularly when printing lines, etc.

In the discussion provided above, it was noted that the data source 21 provided data information having 4 bits per pixel while the data passed along to data bus $D_0$-$D_5$ was 6 bits per pixel. As may be noted in FIG. 2, the data sources output is input to a lookup table memory device 16 along with an address provided by an address generator 25. The address generator points to the location in memory device 16 thereof where data is stored for each particular LED. Thus, a table of memory is provided for each LED and indicates for this LED a corresponding exposure time for each grey level it is to print. It is this exposure time which is a six-bit digital number that is output as data onto data bus $D_0$-$D_5$.

While the six-bit per pixel signal ($D_0$-$D_5$) represents exposure information corrected for nonuniformities of the LED's, it is recognized that during use of the printhead nonuniformities arise due to different aging of the LED's or due to differences in temperature. Aging differences are created when some LED's are used more than others during the course of different print jobs. In U.S. patent application Ser. No. 099,424, filed Sep. 21, 1987, and now U.S. Pat. No. 4,799,071, it is proposed to minimize aging differences by activating underused LED's during periods of non-use of the printer for printing a print job or otherwise correcting for non-uniformities based on differences in aging as the printhead is being used. Thus, factors such as those based on environmental considerations and/or usage may be accommodated by providing updated entries automatically from a correction calculator 16a to lookup table memory 16.

The preferred embodiment has been described in terms of generating a set of center pulse width modulated waveforms for enabling the LED's, wherein in the count-up mode of counter 30 the clock pulses from programmable clock 33 are provided in reverse order from that provided during the count-down mode of counter 30. This is accomplished by loading the FIFO memory (other types of memory devices such as RAM, etc. may be substituted for the FIFO type memory) with the same 12 bit numbers but with the order of providing such numbers reversed from that during count-down. The invention, however, is not limited to providing center pulse width modulated waveforms. For example, all the LED's could become enabled at different times as described but stopped at the same time such as when the count reaches zero with no count-up mode being provided. Likewise, all the LED's may become enabled at the same time and terminated at different times during a count-up mode only. Still further, a count-down and count-up mode may be provided as described for the preferred embodiment but the clock pulses from the variable clock during count-up mode of counter 30 need not be provided to effectively mirror image those provided during the count-down mode of counter 30. Thus, instead of reversing during count-up of counter 30 the order of loading 12-bit numbers from FIFO 18 to 12-bit counter 17 different numbers or ordering may be used during count-up that results in the waveforms not being center pulse-width modulated.

In the preferred embodiment approximations within a grey level have been divided into equal portions. For example, grey level No. 15 is approximated by four exposure times represented by the four vertical lines indicating same. Thus when producing variable clock pulses representing grey level No. 15 the clock pulses produced in that segment of time are equally spaced apart (see FIG. 3, variable clock line). This may be referred to as providing piece-wise linear clock pulsing. A perhaps better control providing more uniformity in printing, may be realized by dividing each grey level non-uniformly, thus providing a totally non-linear clock pulsing from programmable clock 33. In such case, a graph of the parameters exposure time versus value #, similar to that plotted in FIG. 8, would not be a straight line. The 127 clock coefficients or 12-bit numbers stored in FIFO 18 may thus be all different. Where center pulse width modulation is desired, the first 63 coefficients output from FIFO 18 may be all different while the last 63 output from the FIFO being an effective mirror-image or reversal in order of the first 63 to provide a truly non-linear clock pulsing from programmable clock 33.

While the master clock 19 has been described as producing clock pulses at regular intervals which are counted by the 12-bit counter, it is contemplated that this master clock will also be programmable so that while still emitting regular clock pulses, the time period between such regular clock pulses may be adjusted. Such adjustability may be provided by coupling the master clock 19 to the LCU so that either inputs by an operator or through automatic operation, signals from the LCU to the master clock 19 can adjust the period between master clock pulses, as may be needed for color printing or other process control such as contrast.

Thus, in color printing, for example, using well known electrophotographic reproduction apparatus, successive separate image frames on a photoconductor are exposed with color separation images to be developed, respectively, with cyan, magenta and yellow toners. The developed image frames are then transferred in register to a copy sheet. In modulating the electrostatic charge on each image frame with the printing apparatus described herein to from the color separation images the variability of master clock 19 can prove useful. The clock pulse period from adjustable master clock 19 may be adjusted automatically for creating exposures on one color image frame, say cyan, to the next color image frame, say that for producing the magenta image. Adjustability of master clock 19 in combination with the variable programmable clock signals from programmable clock 33 provides for a very efficient and flexible control of exposure. In the example provided above for color reproduction, it is contemplated that the duration of each master clock pulse period used for printing one color separation image frame will differ by a few percent from that used in printing a different color separation image frame to provide the fine control for exposure time.

There has thus been described a method and apparatus for dot printing wherein a programmable clock is employed for generating clock pulses with varying periodicity to create an exposure space that provides gradations of exposure more realistically directed to human visual perception and while doing so provides same with efficient use of data.

The invention has been described in detail with particular reference to preferred embodiments thereof, but it will be understood that variations and modifications can be effected within the spirit and scope of the invention.

We claim:

1. In a circuit for generating a set of waveforms, the circuit comprising:
   digital counting means having a plurality of output lines representing in digital form a time changing numerical count during a count mode;
   clock means coupled to the digital counting means for changing the count represented by the output lines;
   comparator means coupled to the output lines and comparing the time changing count with each of several different predetermined counts and generating respective waveform pulses the durations of each of which are related to a respective predetermined count; and characterized by
   wherein the clock means provides first clock pulses at non-uniform intervals for changing the count at non-uniform intervals during the count mode.

2. The circuit of claim 1 and wherein the counting means is a counter having up and down counting modes; the comparator means commencing and terminating the respective waveform pulses with respective predetermined count and the respective predetermined count in which each waveform pulse commences and terminates is the same numerical count but in different modes of the counter so as to establish a common center time point for the set of waveform pulses.

3. The circuit of claims 1 or 2, and further characterized by wherein the clock means produces during the counting mode some first clock pulses that are at uniform intervals.

4. The circuit of claims 1 or 2 and wherein the clock means includes a master clock for generating high speed clock pulses at uniform intervals, second counter means for counting a predetermined number of high speed clock pulses and generating a first clock pulse in response to the count of the predetermined number of high speed clock pulses and means for changing the predetermined number to change the interval between first clock pulses.

5. In a non-impact printer which comprises:
an array of radiation emitting elements;
an imaging surface adapted to receive the radiation;
means for selectively enabling the elements for predetermined periods of time during a cycle of operation to form an image on the surface;
the enabling means including circuit means for generating a pulse-width modulated set of waveforms for determining the enabling times of selected elements; and wherein the circuit comprises:
digital counting means having a plurality of output lines representing in digital form a time changing numerical count during a count mode;
clock means coupled to the digital counting means for changing the count represented by the output lines; and
comparator means coupled to the output lines and comparing the time changing count with each of several different predetermined counts and generating respective waveform pulses the duration of each of which are related to a respective predetermined count; and characterized by
wherein the clock means provides first clock pulses at non-uniform intervals for changing the count at non-uniform intervals during the count mode.

6. The printer of claim 5 and wherein the counting means is a counter having up and down counting modes; the comparator means commencing and terminating the respective waveform pulses with respective predetermined counts, and the respective predetermined count in which each waveform pulse commences and terminates is the same numerical count but in different modes of the counter so as to establish a common center time point for the set of waveform pulses.

7. The printer of claims 5 or 6 and wherein the array of radiation emitting elements comprises light emitting diodes and wherein a light-emitting diode is enabled for a time period predetermined by the duration of a waveform pulse.

8. The printer of claims 5 or 6 and including data source means for providing different respective predetermined counts to establish for each of said elements different enabling times over the course of several cycles in accordance with data to be printed by said each of said elements.

9. The printer of claims 5 or 6, and further characterized by wherein the clock means produces some first clock pulses that are at uniform intervals.

10. The printer of claims 5 or 6, and wherein the clock means includes a master clock for generating high speed clock pulses at uniform intervals, second counter means for counting a predetermined number of high speed clock pulses and generating a first clock pulse in response to the count of the predetermined number of high speed clock pulses and means for changing the predetermined number to change the interval between first clock pulses.

11. In a method of printing which uses an array of radiation-emitting elements, the method comprising the steps of
(a) advancing an imaging surface adapted to receive the radiation relative to the array, selectively enabling the elements for predetermined periods of time during a cycle of operation to form an image on the surface;
(b) operating a digital counting means having a plurality of output lines with signals thereon representing in digital form a time-changing numerical count;
(c) changing the count represented by the output lines in response to first clock pulses;
(d) comparing the time-changing count with each of several different predetermined counts and generating respective waveform pulses, each of which commences and/or terminates with a respective predetermined count, the time duration of each waveform pulse being different dependent upon the respective predetermined count selected; and
(e) the set of waveform pulses determining the enabling times of selected elements; and characterized by
in step (c) providing the first clock pulses at non-uniform intervals.

12. The method of claim 11, and wherein the set of waveforms have a common center time point.

13. The method of claims 11 or 12, and wherein the time-changing count is compared with a predetermined count representing data signals to be printed and the predetermined counts change for each of said elements in accordance with the data signals to be printed.

14. The method of claim 13, and wherein the data signals comprise data signals for variable grey level printing.

15. The method of claim 14, and wherein the data signals for grey level printing represent activation times for the radiation-emitting elements, the activation times being adjusted to correct for nonuniformities of the elements.

16. The method of claim 14, and wherein the data signals for grey level printing are created in response to other data signals representing levels of grey of dots to be printed, the levels of grey represented by said other data signals being uniformly stepped in psychometric lightness space.

17. In a non-impact printer which comprises:
a plurality of radiation emitting elements;
an imaging surface adapted to receive the radiation;
means for selectively enabling the elements during predetermined picture element periods of time to form an image on the surface; the selective enabling means including:
data source means providing a multibit grey level signal for each picture element, a grey level signal being represented by N digital bits of data wherein N is an integer greater than one;
correction means responsive to said grey level signal for generating a corrected grey level signal of N plus M bits of data wherein M is an integer greater than zero; and
means for controlling the time duration of the enabling of a radiation emitting element in response to the corrected grey level signals.

18. The printer of claim 17 and wherein, the selective enabling means comprises a digital counter, clock means for changing the output count of the counter, and comparator means for comparing the changing output count of the counter with the corrected grey level signal.

19. The printer of claim 18 and wherein the clock means provides clock pulses at non-uniform intervals.

20. The printer of claim 10 and wherein the master clock is an adjustable clock and means for adjusting the period of clock pulses from the master clock in response to a process condition for the image frame being exposed on the imaging surface.

21. The printer of claim 20, and wherein the process condition is color printing and the means for adjusting the period of clock pulses from the master clock is in response to printing one of the color separation images in a series of color separation images to be used to form a multicolored reproduction.

22. In a non-impact printer which comprises:
an array of radiation emitting elements;
an imaging surface adapted to receive the radiation;
means for selectively enabling the elements for predetermined periods of time during a cycle of operation to form a series of color separated images on the surface;
the enabling means including circuit means for generating a pulse-width modulated set of waveforms for determining the enabling time of selected elements; and wherein the circuit comprises:
digital counting means having a plurality of output lines representing in digital form a time changing numerical count during a count mode;
clock means coupled to the digital counting means for changing the count represented by the output lines; and
comparator means coupled to the output lines and comparing the time changing count with each of several different predetermined counts and generating respective waveform pulses, the duration of each of which are related to a respective predetermined count; and characterized by
wherein the clock means provides first clock pulses for changing the count during the count mode and wherein the rate of changing the count is different during enablement of the radiation emitting elements for forming an image to be in one of the colors of the series of color separated images from that rate used in enablement of the elements for forming an image to be in another color for the same series of color separated images.

23. The printer of claim 22, and wherein the clock means provides the first clock pulses at non-uniform intervals during an exposure of an image pixel.

24. The printer of claims 22 or 23, and wherein the clock means includes a master clock for generating high speed clock pulses at uniform intervals, second counter means for counting a predetermined number of high speed clock pulses and generating a first clock pulse in response to the count of the predetermined number of high speed clock pulses and means for changing the predetermined number to change the interval between first clock pulses.

25. In a method of printing which uses an array of radiation-emitting elements, the method comprising the steps of
(a) advancing an imaging surface adapted to receive the radiation relative to the array, selectively enabling the elements for predetermined periods of time during a cycle of operation to form an image on the surface;
(b) operating a digital counting means having a plurality of output lines with signals thereon representing in digital form a time-changing numerical count;
(c) changing the count represented by the output lines in response to first clock pulses;
(d) comparing the time-changing count with each of several different predetermined counts and generating respective waveform pulses, each of which commences and/or terminates with a respective predetermined count, the time duration of each waveform pulse being different dependent upon the respective predetermined count selected; and
(e) the set of waveform pulses determining the enabling times of selected elements; and characterized by
in step (c) providing the first clock pulses at different rates for printing of images to be in different colors.

26. The method of claim 25, and wherein the first clock pulses are provided at non-uniform intervals during imaging of a picture element.

27. The method of claims 25 or 26, and wherein the time-changing count is compared with a predetermined count representing data signals to be printed and the predetermined counts change for each of said elements in accordance with the data signals to be printed.

28. The method of claim 27, and wherein the data signals comprise data signals for variable grey level printing.

29. The method of claim 28, and wherein the data signals for grey level printing are created in response to other data signals representing levels of grey of dots to be printed, the levels of grey represented by said other data signals being uniformly stepped in psychometric lightness space.

30. The method of claim 29, and wherein the data signals for grey level printing represent activation times for the radiation-emitting elements, the activation times being adjusted to correct for nonuniformities of the elements.

31. A non-impact printer apparatus comprising:
a plurality of recording elements;
means for providing a multibit data signal to each of the recording elements for recording a picture element;
clock means providing clock pulses for controlling the enablement times of said recording elements during recording of said picture elements; and
means for adjusting the clock means in response to a signal representing a color for an image being recorded, whereby the enablement time for recording, in response to a multibit data signal, a picture element for an image to be in one color is different than the enablement time for recording, in response to an identical multibit data signal, a picture element for an image to be in a different color.

32. A method of non-impact printing, comprising:
generating a multibit data signal for each of a plurality of recording elements for recording respective picture medium upon a recording element;
generating clock pulses for controlling the enablement times of said recording elements during recording of said respective picture elements; and
adjusting the enablement times for recording respective picture elements in response to a signal representing a color for an image being recorded, the enablement time for recording, in response to a multibit data signal, a picture element for an image to be in one color being different than the enablement time for recording, in response to an identical multibit data signal, a picture element for an image to be in a different color.

* * * * *